Jan. 14, 1936.  B. M. GREEN  2,028,063
AZIMUTH COMPASS
Filed Jan. 20, 1934  3 Sheets-Sheet 1

Inventor
Burton M. Green
By Lloyd W. Patch
Attorney

Jan. 14, 1936.  B. M. GREEN  2,028,063
AZIMUTH COMPASS
Filed Jan. 20, 1934   3 Sheets-Sheet 2
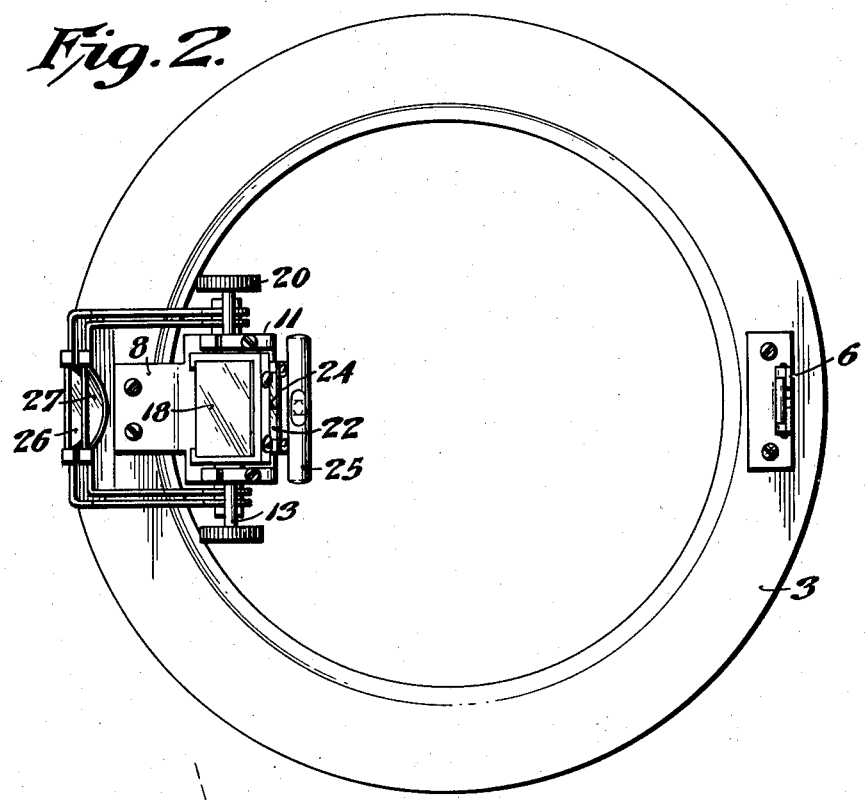
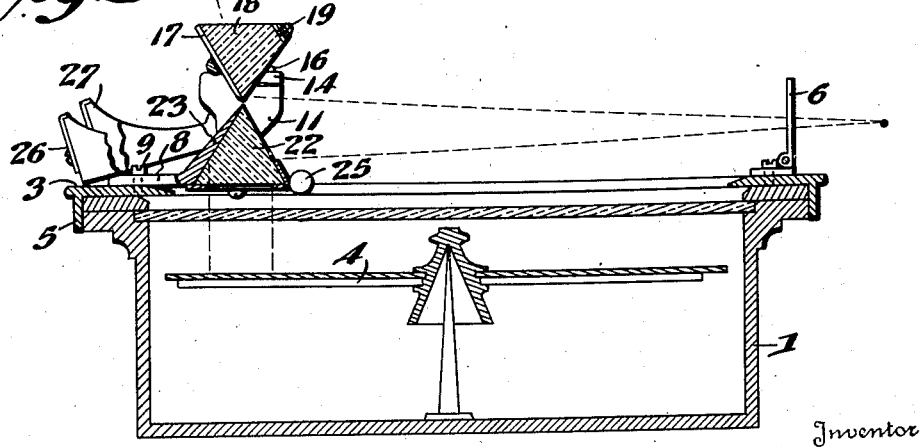
Inventor
Burton M. Green
By Lloyd W. Patch
Attorney Jan. 14, 1936.  B. M. GREEN  2,028,063
AZIMUTH COMPASS
Filed Jan. 20, 1934   3 Sheets-Sheet 3
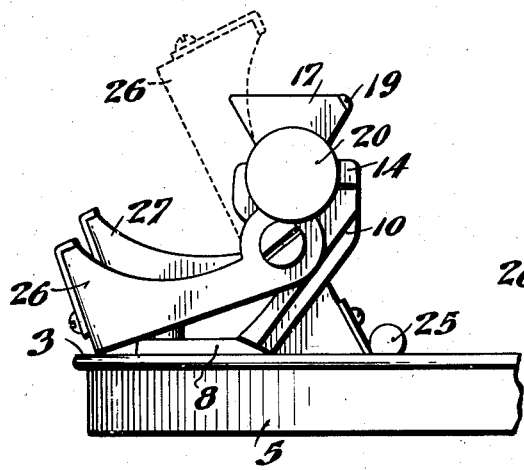
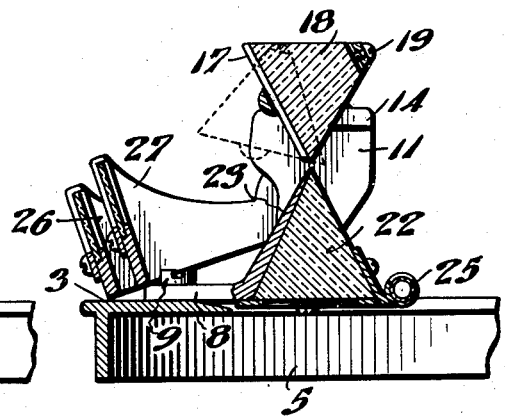
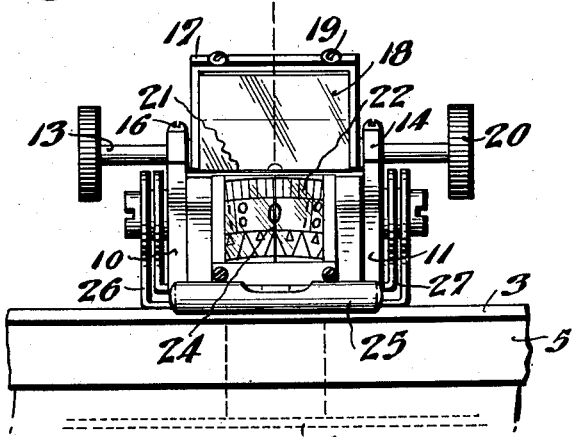
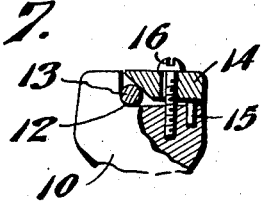
Inventor
Burton M. Green
By Lloyd W. Patek
Attorney Patented Jan. 14, 1936

2,028,063

UNITED STATES PATENT OFFICE 2,028,063

AZIMUTH COMPASS

Burton M. Green, Brooklyn, N. Y.

Application January 20, 1934, Serial No. 707,585

12 Claims. (Cl. 88—2.3)

My invention relates to azimuth compasses, and particularly to an azimuth ring or circle to be associated with a mariner's or navigator's or surveyor's or other compass, and to be used in showing the direction with respect to the compass of the sun or a star or a landmark or other celestial or terrestrial indication, point, object or the like.

An object of this invention is to provide a device of this character that can be employed in place of structures now used, and which does not require projection of a light ray, but rather only a discernible reflection of an image, thus being adaptable for use in focusing upon and reflecting images of terrestrial points, and upon stars and other celestial points, as well as the sun.

A further object is to provide a structure of this character that can be focused upon non-luminous objects, upon lighted objects, and upon the sun, stars or other luminous or bright bodies when in full brilliancy and when partially dulled or obscured by clouds, mist, fog, or other causes, as no reflected transmission of light rays is necessary.

Another object is to so construct and associate the parts that the instrument can be adjusted to focus upon and reflect an object, landmark, or other terrestrial point substantially upon the level of the horizon, or upon the sun, a star, or other celestial point at any elevation or angle from the horizon up to the meridian or zenith.

Still another purpose of this invention is to provide an instrument that will give a full view reading of the indicating portion of the compass card without confusion or distortion due to perspective or the like, and that will show clearly and sharply and closely adjacent and in the same field of vision the desired reflected image being focused upon.

Yet another purpose is to provide a device of this character that can be temporarily or permanently associated with compasses of various types and constructions to accomplish the desired functions and purposes, and which will not in any way interfere with or obstruct the use of the compass for ordinary purposes, there being no necessity of removing, disconnecting, or specially adjusting or otherwise changing any of the parts to permit ordinary and normal use of the compass.

With the above and other objects in view, which will be apparent to those skilled in the art, my invention includes certain novel features of construction and combinations of parts which will be hereinafter set forth in connection with the drawings and then pointed out in the claims.

In the drawings:

Fig. 2 is a plan view.

Fig. 3 is a transverse vertical view through the structure illustrated in Fig. 2.

Fig. 4 is an enlarged side elevation to better show the prismatic supporting and mounting structure.

Fig. 5 is an enlarged sectional view to better show the mounting and adjustment of the prismatic structure.

Fig. 6 is a fragmentary illustration in elevation to show the view as taken through the sight when the structure is in use.

Fig. 7 is a broken sectional view showing one of the bearings for the image reflector.

Figure 1:
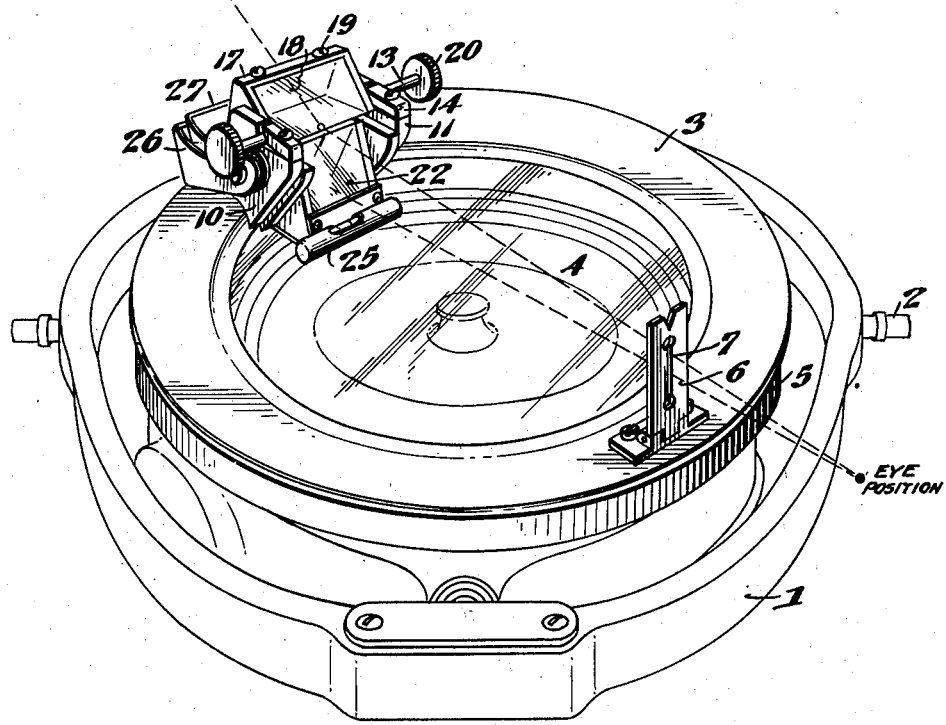
Figure 1 is a view in perspective illustrating an adaptation of my invention.

In the present instance I have illustrated the invention embodied with one type of azimuth ring or circle, and as used with a magnetic compass of the navigating type, but as the description progresses it will be seen that this same prismatic principle can be embodied in an attachment to be mounted upon and operatively associated with azimuth circles of various designs, and with various types of compasses, surveying instruments and other instruments including a compass.

Briefly, this invention contemplates the use of two reflecting prisms employed to bring reflected images into the line of sight and into proximate position in the same field of vision. One prism, or reflector, reflects a reading of the compass carried in the plane of the line of sight, and the second prism, preferably mounted directly over the first prism, is adjustable to bring the reflected image of a celestial or terrestrial body or object into the line of sight coinciding with the reflecting compass field in the first prism, thereby giving two images reflected in the line of sight in a plane cutting the center of the compass.

The compass as here indicated, and as generally designated at 1, is a magnetic marine compass of the standard type, and the gimbals 2 can be mounted in a compass box or in any other desired arrangement. Further, the gimbal arrangement can be entirely dispensed with and the structure of my invention can be applied to and used with a surveyor's compass, or any other compass instrument. However, it is necessary that some means be provided for automatically or manually or mechanically leveling the compass.

A flat ring 3 is adapted to be mounted revolubly around the indicating portion of the compass 1, and in the present instance this ring 3 is illustrated as encircling the opening of the compass through which the compass card 4 is visible. A flange 5 is provided on the ring 3 to hold this ring to rotation upon a vertical axis coinciding with the axis of rotation of the compass card 4. While I have shown no special means for rotating or moving this ring 3 to adjust the same for taking bearings, any worm and rack, or other known ring rotating mechanism can be employed, and in some instances it may be found desirable to incorporate a vernier mechanism for securing a final sharp setting of the ring.

At one side of the ring 3 a sight 6 is mounted in fixed position, and this sight can be of any desired construction, either rigid or foldable. I have here shown a folding sight 6 having a sight slit or opening 7 therethrough centered on the axis of rotation of the ring, and consequently also the axis of rotation of the compass card, but this sight can be of other forms and constructions, either with or without a sight hair or line. As thus described, the parts can be such as have heretofore been used in various adaptations and connections.

At a point diametrically opposite the mounting of the sight 6, a mounting bracket 8 is fixed and secured upon the ring 5 by means of screws 9, or other suitable fastenings, and this portion 8 serves as a supporting and bearing bracket for the mechanical features of my invention. The bracket 8 has upstanding bearing portions 10 and 11 preferably spaced substantially equally on opposite sides of a line taken diametrically through the sight 6. These bearing portions 10 and 11 have bearing recesses 12 to receive and center pintle shafts 13 upon a horizontal axis, and blocks 14 held in position by pins 15 are adapted to be adjusted against the pintle shafts 13 by means of screws 16, thus permitting adjustment and variation of the frictional bearing of these pintle shafts. A suitable frame 17 is rigidly mounted between the inner ends of pintle shafts 13 and a reflecting prism 18 is mounted in this frame and is held secure therein by means of screws 19, or other suitable fastenings. This prism 18 is so mounted and disposed that one angle is adjacent to the axis of rotation of the pintle shafts 13, and the prism is held with its various angular side edges in exact horizontal relation when the ring 3 is automatically or mechanically leveled. The pintle shafts 13 have handwheels 20 thereon by which the prism 18 can be oscillated to focus upon a terrestrial or celestial object or body and reflect same adjacent to the edge or angle 21 nearest the center of oscillation.

Beneath the mounting of the image reflecting prism 18, a compass reflecting prism 22 is mounted and held in fixed position between the brackets 10 and 11. This prism 22 is disposed with its lower face substantially parallel with the compass card 4, and a shield or backing 23 is provided on the outer face of prism 22, so that as the prism 22 is viewed through the sight 6 a portion of the compass card immediately beneath the prism will be reflected to be visible from the sight. A center line, hair, wire, or other mark is provided to establish a mark, as at 24, within the reflected field of prism 22, and this center line is in a vertical plane cutting the sight 6 and the axis of rotation of the compass card 4 and the ring 3. The upper angle of prism 22 is held to be closely adjacent to the angle edge 21 of prism 18, and the center line mark 24 therefore serves for centering on the lower angle edge 21 of this prism 18. The prism 22 has all of its angular side edges parallel with each other and with the side angle edges of prism 18, and consequently all angle edges of both prisms will be disposed in true horizontal relation when the ring 3 is leveled.

To secure proper and accurate focusing and sighting, it is necessary that prisms 18 and 22 must be level or with their angle edges horizontal and their faces correspondingly disposed, and as a ready check to insure proper leveling, a bubble or spirit level 25 is provided immediately in front of the lower portion of prism 22, where it can be readily viewed by a person using the instrument.

As observations are to be made of and bearings are to be taken from stars and other celestial bodies, and landmarks and other terrestrial objects, it is desirable that a clear and fully polished prism 18 be employed to give clearcut and sharp reflections; however, where observations are to be taken of the sun unobscured by clouds, it may be found that the reflected image will be too bright for satisfactory and comfortable viewing, and in other uses it may be found desirable to shade the image reflecting prism 18. Therefore, I have provided two shields 26 and 27 carrying dark glass or other suitable screening material, and so mounted that they can be swung to positions to clear the prism 18, as illustrated by the full lines in each instance, and can be raised or swung up, as indicated by the dotted lines in Fig. 4. With the prism 18 mounted in the manner set forth, this prism can be oscillated to focus upon and reflect an image of a terrestrial object substantially at or even below the horizon, and of celestial bodies at any angle above the horizon to the zenith. One or both shields 26 and 27 can be adjusted to any desired position for the particular setting of the prism 18 and the angle of the sun or other body being viewed.

To take a bearing of any terrestrial point or object, or any celestial body, it is only necessary to turn or rotate the ring to train the instrument toward the desired bearing. The eye is then placed to the sight vane and by turning the object or image reflecting prism 18, the desired image will be reflected in this prism and in the field of vision through the sight. Then, further adjustments of the ring, and any necessary compensating adjustments of the prism 18 can be made so that the image reflected therein will be focused on the center line 24 to thus be closely adjacent to and in the field of vision with the reflection of the compass card shown in base prism 22. Thus, bearings of objects and bodies from the horizon to the zenith can be readily and accurately obtained, with no chance of error entering into the bearing from rolling or swaying of a ship or other support on which the compass is mounted.

This invention is unique in the use of two prismatic reflecting glasses, one mounted above the other, and with the lower or base prism reflecting the arc of the compass in the line of sight when the upper or object prism reflects the image of a terrestrial object or a celestial body brought into the field of vision by adjustment of this object compass. When adjustments are made to visibly show the proper centering of the reflected image of the body or object in the object prism, the effective arc of the compass is reflected in the base prism, and the operator or user can be certain that absolutely accurate bearings are being taken, as the reflected image and the reflected reading of the compass card are in the same field of vision, and both are in a perpendicular plane cutting through the compass center and through the object or body, no matter what the elevation of the body or object may be.

This prismatic principle can be made into an attachment mounted on a portable bracket to be adjusted to and used with azimuth circles of various types; and, obviously, the structure and principle can be employed and used with substantially any azimuth, compass, or other instrument having a revoluble ring or with which such a ring can be employed.

While I have herein shown and described only certain specific embodiments of my invention, and have suggested only certain possible modifications, it will be understood and appreciated that changes and variations can be made in the form, construction, assembly or association, and use without departing from the spirit and scope of my invention.

I claim:

1. An apparatus for taking bearings comprising, a compass, a ring revolubly associated with said compass, a sight at one side of said ring, a reflector associated with said ring at a point substantially diametrically opposite said sight to reflect readings of the compass, and a second reflector associated with said ring at a fixed location immediately adjacent to and within the field of vision with said first reflector as viewed through the sight and adjustably held to permit focusing of an image adjacent to the reflected compass reading.

2. An apparatus for taking bearings comprising, a compass, a ring associated with said compass and revoluble in a horizontal plane, a sight at one side of said ring, a reflecting prism associated with said ring at a point opposite the sight to reflect compass readings to show variations in the line of sight as the ring is revolved, and a reflecting prism carried by said ring immediately above and in fixed position in the field of vision with the compass reflecting prism and adjustably mounted to allow focusing upon and reflection of an external image.

3. An apparatus for taking bearings comprising, a compass, a ring associated with said compass and revoluble in a horizontal plane, a sight associated with said ring at one side, a fixed reflecting prism associated with said ring at a point diametrically opposite the sight and disposed to catch and reflect readings of the compass to be readable through the sight, bearings associated with the ring at fixed points immediately adjacent to the compass reflecting prism, a second reflecting prism rotatably mounted in said bearings above and in close proximity to the first mentioned prism to be adjusted to externally catch and reflect an image, and a center line indication to which the image and the reflected compass reading are centered in a single field of vision through the sight.

4. An apparatus for taking bearings comprising, a compass, a ring associated with said compass to encircle the face thereof and revoluble in a horizontal plane, a sight at one side of said ring, a fixed reflecting prism carried by the ring at a point opposite the sight to reflect compass readings to show variations in the line of sight as the ring is revolved, a second reflecting prism carried by said ring immediately adjacent to and above the first mentioned prism and oscillatable upon a horizontal axis to permit adjustment of the second prism to focus desired terrestrial and celestial images to bring the same into the field of vision with a compass reflecting prism, and means to indicate leveling of the ring transversely to the line of sight.

5. An apparatus for taking bearings comprising, a compass, a ring associated with said compass to encircle the face thereof and revoluble in a horizontal plane, a sight at one side of said ring, a fixed reflecting prism carried by the ring at a point opposite the sight to reflect compass readings to show variations in the line of sight as the ring is revolved, a second reflecting prism carried by said ring immediately adjacent to and above the first mentioned prism and oscillatable upon a horizontal axis to permit adjustment of the second prism to focus desired terrestrial and celestial images to bring the same into the field of vision with a compass reflecting prism, means to indicate leveling of the ring transversely to the line of sight, and means to indicate on the first prism a hairline center to permit accurate determination of compass readings and to establish a center to which the reflected image can be centered to be exactly in the line of sight by rotation of the ring.

6. An apparatus for taking bearings comprising, a compass, a ring revolubly associated with said compass to encircle the face thereof and be rotatable on a vertical axis, a sight carried by said ring at one side, a bearing and supporting structure carried by said ring at a point substantially diametrically opposite the sight, a reflecting prism held in fixed mounting by said supporting structure to be in a line from the sight diametrically across the compass, said prism being disposed to reflect compass readings through the sight and having a center line indicated directly from the sight across the compass center, a second reflecting prism, bearings mounting said second reflecting prism in the bearing and supporting structure to be oscillatable on a horizontal axis above the first reflecting prism and with one of its angular corners closely adjacent to a corner of the first prism, and means by which said second reflecting prism can be oscillated to focus desired terrestrial and celestial images.

7. An apparatus for taking bearings comprising, a compass, a ring revolubly associated with said compass to encircle the face thereof and be rotatable on a vertical axis, a sight carried by said ring at one side, a bearing and supporting structure carried by said ring at a point substantially diametrically opposite the sight, a reflecting prism held in fixed mounting by said supporting structure to be in a line from the sight diametrically across the compass, said prism being disposed to reflect compass readings through the sight and having a center line indicated directly from the sight across the compass center, a second reflecting prism, bearings mounting said second reflecting prism in the bearing and supporting structure to be oscillatable on a horizontal axis above the first reflecting prism and with one of its angular corners closely adjacent to a corner of the first prism, means by which said second reflecting prism can be oscillated to focus desired terrestrial and celestial images, and level indicating means carried by the ring and also in the line of vision through the sight.

8. With a compass, a ring associated with the compass and revoluble in a substantially horizontal plane, a sight carried by said ring for viewing radially with respect to the compass, a prism carried by the ring within the line of vision through the sight to reflect and show compass readings directly in the line of sight, and a second reflecting prism mounted closely adjacent to and above said first prism and adjustable on a substantially horizontal axis to be set to catch and reflect within the line of sight and closely adjacent to the reflection of the compass reading a showing of an external image.

9. With a compass, a ring revolubly associated with the compass, a bracket carried by the ring, a sight lined up to direct a line of sight substantially radially with respect to the ring, a reflecting prism carried by said bracket overhanging inside of the ring to catch a reading of the compass card in line with the line of sight, a second prism swingably mounted closely adjacent to the first prism to be oscillated on a substantially horizontal axis to draw in and reflect an image of an external body to be closely adjacent and within the sight line, and means also visible in the line of sight to indicate leveling of the ring.

10. In combination with a compass, a support revolubly mounted to be turned with respect to the compass upon a vertical axis substantially coinciding with the axis of the compass card, a reflecting prism carried by said supporting structure in fixed mounting to reflect and show a compass reading to be viewed in a line across the compass card, and a second reflecting prism adjustably mounted closely adjacent to the upper part of the first prism and swingable upon an axis substantially at right angles to the axis upon which the supporting structure is moved to thus permit focusing to catch and reflect an external image in the same field of vision with the reflected showing of the portion of the compass card in said first prism.

11. In combination with a compass structure, a ring revolubly associated with the compass to be adjustable on a vertical axis substantially coinciding with the axis of the compass, a sight carried on the near side of the ring, a reflecting prism fixed on the far side of the ring to be viewed through said sight and to reflect an effective compass reading, and a second reflecting prism carried by said ring closely adjacent to the upper part of the first prism and adjustably mounted to be swung upon an axis substantially at right angles to the axis of adjustment of the ring to thus permit focusing to show an image of an external reflection in juxtaposition to and in the field of vision with the reflected compass reading as seen through the sight.

12. In combination with a compass, a ring mounted upon the compass and revoluble on a vertical axis substantially coinciding with the axis of the compass, a prism carried by said ring at one side to reflect an effective reading of the compass to be viewed substantially diametrically across the ring and having one of its angles disposed upwardly and extending substantially at right angles to the axis of rotation of the ring, and a second prism swingably mounted upon the ring adjacent to the upper angle of the first prism for adjustable swinging movement on an axis substantially at right angles to the axis of rotation of the ring to thus be adjustable to show an image of an external reflection closely adjacent to and in the field of vision with the reflected reading of the compass card as shown in the first prism.

BURTON M. GREEN.